United States Patent Office 2,955,202
Patented Oct. 4, 1960

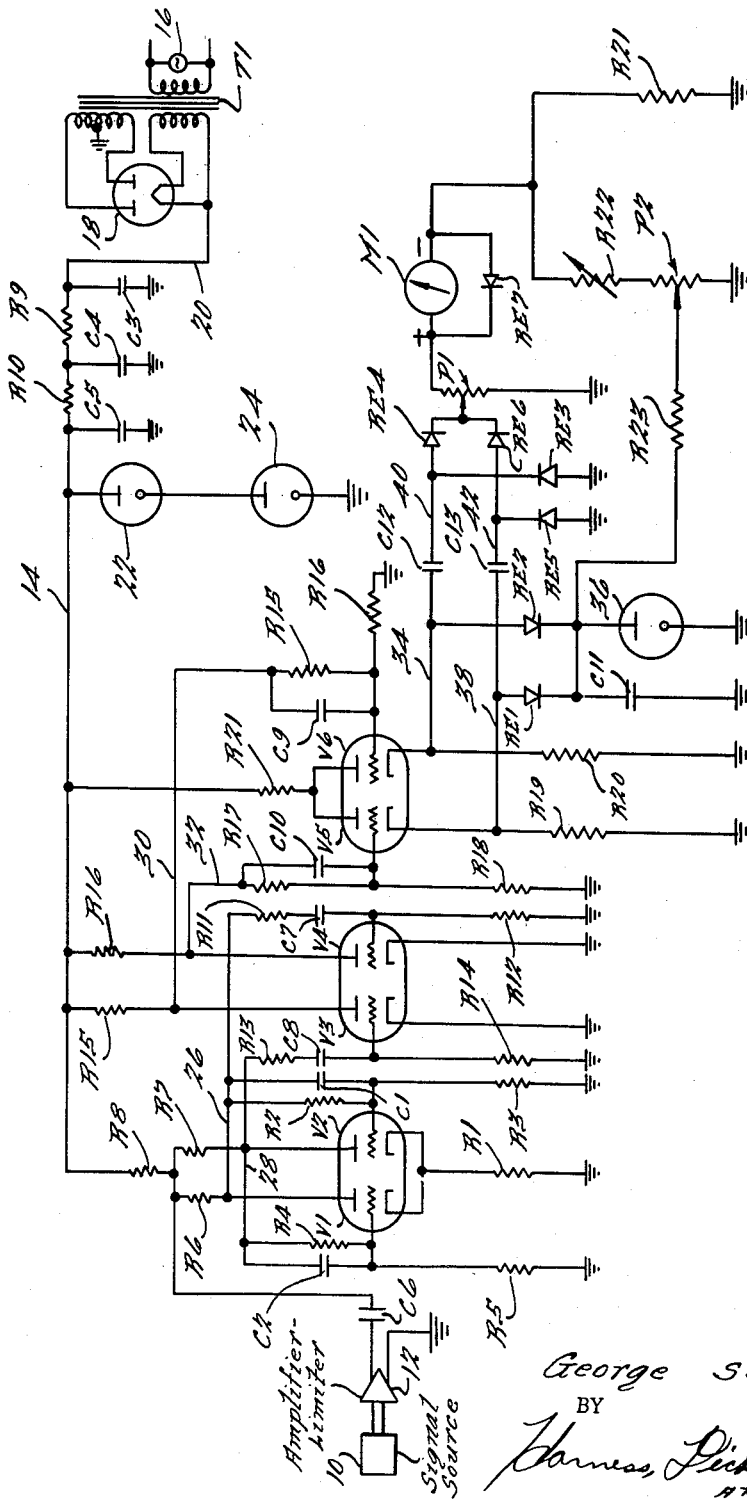

2,955,202

FREQUENCY MEASURING EQUIPMENT

George Scourtes, Detroit, Mich., assignor to George L. Nankervis Company, Detroit, Mich., a corporation of Michigan Filed Dec. 4, 1958, Ser. No. 778,198

9 Claims. (Cl. 250—27)

This invention relates to frequency measuring equipment and more particularly to a system for producing a direct voltage having a magnitude which varies in accordance with the freqnency of a pulsating signal.

In general, in the disclosed arrangement, the pulsating signal, which may be a sinusoidal alternating signal of unknown frequency or a pulse train of substantially any form recurring at an unknown rate, is amplified and limited to produce an amplified pulsating signal of controlled peak amplitude and this signal is in turn formed, by a flip-flop or similar device, into a train of square-wave pulses having a substantially constant peak amplitude and having a frequency related to the frequency of the pulsating signal. These square-wave pulses are amplified and applied through a cathode follower to a differentiating network. The sharp pulses or pips of one polarity are by-passed to ground and the pulses of the other polarity are integrated to produce a direct voltage having a magnitude which varies in accordance with the frequency of the pulsating signal.

It has previously been found that peak amplitude variations tend to occur in the square-wave pulses primarily as a result of changes in tube characteristics and in supply voltage variations and that the resultant change in the amplitude of the derived pips produces an improper change in the magnitude of the produced direct voltage, leading to erroneous indications.

In the arrangements disclosed in my United States patent applications, Serial No. 536,232, filed September 23, 1955, now abandoned, and Serial No. 648,359, filed March 25, 1957, now abandoned, this source of error was reduced or obviated by producing a second direct voltage the amplitude of which varied only with amplitude variations of the square-wave train, utilizing the difference between the frequency-and-amplitude sensitive direct voltage and the amplitude-sensitive direct voltage as the output signal of the device.

In the present improved arrangement, which is particularly advantageous for use with a galvanometer indicating means, the need for deriving an amplitude-sensitive direct voltage is obviated by effectively eliminating amplitude variations of the square-wave train. To this end, one of the two values between which the square-wave train swings is effectively fixed as by making it equal to ground potential. In the preferred arrangement in which a cathode follower is employed, this is accomplished by reducing the conductivity of the cathode follower tube to zero each half cycle of the applied train. The other value of the square-wave voltage is effectively fixed through the use of a clamping circuit including a unidirectional current conducting device and a voltage regulating gaseous discharge device connected in series with one another across the cathode-follower load resistor. The circuitry is arranged so that the cathode voltage will, during the subject portion of the square-wave, tend to be greater than the value of the regulated voltage across the voltage regulating device under all expected conditions of variation. As a result, this second value of the square-wave train will tend to be stabilized at a selected value determined by the characteristics of the gaseous discharge device.

In practice, it was found that proper action was not obtained in such an arrangement due to the failure of the voltage regulating gaseous discharge device to operate instantaneously and uniformly when subjected to the abruptly changing square-wave voltage, leading to transient disturbances which produced erroneous output indications. Therefore, in accordance with the principles of the present invention, two square-wave voltage trains are generated from the same pulsating signal with those two trains being 180 degrees out of phase with one another. Each train is applied through an individual cathode follower and the voltages across both load resistors of both cathode followers are applied through individual unidirectional current conducting devices across the same voltage regulating gaseous discharge device. Since the peak amplitudes of the two square-wave trains are normally equal or substantially equal to one another and since the two trains are 180 degrees out of phase with one another, the applied voltage across the voltage regulating gaseous discharge device does not vary abruptly at the pulse-train frequency and accordingly the voltage regulating device is not subjected to abrupt voltage changes leading to the aforementioned transient disturbances. In this manner, the system is enabled to produce a direct voltage which varies substantially exclusively with the frequency of the input pulsating signal.

The objects and features of the invention will be appreciated from the following detailed description of an embodiment of the invention when read with reference to the accompanying drawing the single figure of which represents, in schematic form, a circuit embodying the principles of the invention.

The input pulsating voltage is derived from a source 10 represented in block diagrammatic form. Any suitable source may be employed such as, for example, a flow meter as disclosed in my application Serial No. 648,359. The pulsating signal may be sinusoidal, may consist of a series of spikes, or may assume any other recurrent form. It preferably varies in frequency or recurrence rate in a determinable relation with the state or rate of change of some condition.

The pulsating signal is applied to an amplifier limiter 12 of suitable conventional construction (see my application Serial No. 648,359) which serves to amplify and shape the pulsating signal to a form suitable for application as an input signal to a bistable multivibrator or flip-flop circuit comprising tubes V1 and V2. In a practical system, the source 10 produced a pulsating voltage which was generally sinusoidal and the amplifier limiter 12 took the form of an even number of amplifier-limiter stages so that the output voltage from unit 12 assumed a generally square-wave form as the result of the clipping of both peaks of the generally sinusoidal signal.

The flip-flop circuit, as illustrated, comprises tubes V1 and V2 the cathodes of both of which are connected to ground through a common cathode resistor R1. The anode of section V1 is coupled to the control grid of section V2 by means including resistor R2 and capacitor C1 in parallel with one another, and grid return resistor R3, and the anode of section V2 is coupled to the control grid of section V1 by means of resistor R4 paralleled by capacitor C2, and grid return resistor R5. The anodes of tubes V1 and V2 are connected to a suitable source of operating potential at conductor 14 through individual load resistors R6 and R7, respectively, and through common anode resistor R8.

The positive potential on conductor 14 is produced by full-wave rectification, filtering and regulation of an alternating voltage derived from source 16. This alternating voltage is applied to the primary winding of power transformer T1, the secondary of which is connected to full-wave rectifying double diode 18, the rectified alternating voltage appearing between conductor 20 and ground. The rectified voltage appearing between conductor 20 and ground is filtered by the network including capacitors C3, C4 and C5 and resistors R9 and R10. The resultant direct voltage appearing between conductor 14 and ground is regulated in any suitable fashion as by means of the illustrated serially interconnected voltage regulating gaseous discharge devices 22 and 24. In a constructed embodiment of the invention, devices 22 and 24 were type 6074 devices each adapted to maintain a voltage drop of 108 volts thereacross so that the voltage between conductor 14 and ground was maintained substantially at 216 volts.

The essentially square-wave voltage pulse train from amplifier-limiter 12 is applied through capacitor C6 to the junction of resistors R6, R7 and R8. In the illustrated arrangement, the flip-flop circuit comprising sections V1 and V2 will be triggered to the other of its two stable states at each positive-going transition of the signal applied thereto through capacitor C6, producing trains of square-wave pulses at the anodes of both sections and hence at conductors 26 and 28. The two pulse trains are equal in frequency but 180 degrees out of phase with one another. Their frequency is controlled by the frequency of the input pulsating signal. It will be observed that the fact that the frequency of each pulse train is but one-half of the frequency of the input signal is of no particular significance to the ultimate operation of the system.

In the aforesaid constructed embodiment of the invention, the positive potential between conductor 26 or conductor 28 and ground changed in amplitude, in a square-wave fashion, by about 50 to 60 volts.

The signal appearing on conductor 28 is applied to the control grid of an amplifying triode V4 through a coupling network comprising resistors R11 annd R12 and capacitor C7, while the signal appearing on conductor 28 is applied to the control grid of amplifying triode V3 through a coupling network comprising resistors R13 and R14 and capacitor C8. The cathodes of triodes V3 and V4 are grounded, while the anodes are connected to the positive potential on conductor 14 through individual load resistors R15 and R16, respectively. As a result, the two square-wave trains are individually amplified and the amplified trains appear between conductors 30 and 32 and ground.

The square-wave signal appearing between conductor 30 and ground is applied to the control grid of cathode follower triode V6 through a network comprising resistors R15 and R16 and capacitor C9 (connected in parallel with resistor R15), while the signal appearing between conductor 32 and ground is applied to the control grid of cathode follower triode V5 through a coupling network comprising resistors R17 and R18 and capacitor C10 (connected in parallel with resistor R17). The cathodes of sections V5 and V6 are connected to ground through individual load resistors R19 and R20, respectively, while the anodes are connected to the positive potential on conductor 14 through common resistor R21 the value of which is low relative to the resistance of resistors R19 and R20. The output signal from cathode followers V5 and V6 is again a pair of square-wave trains, the output voltage of tube V5 appearing across resistor R19 and hence between conductor 34 and ground and the output voltage of tube V6 appearing across resistor R20 and hence between conductor 38 and ground.

The output voltage appearing across resistor R19 is applied, by means of conductor 38, across serially interconnected unidirectional current conducting device RE1 and voltage regulating gaseous discharge device 36, device 36 being shunted by capacitor C11, and the output voltage appearing across resistor R20 is applied, by means of conductor 34, across serially interconnected unidirectional current conducting device RE2 and the device 36. Otherwise stated, the square-wave train on conductor 38 is applied through device RE1 across device 36 and the train appearing on conductor 34 is applied through device RE2 across device 36. Devices RE1 and RE2 are dry disk or, preferably, semi-conductor diodes poled to present a low impedance to conventional current flow in the direction of the arrows and to present a high impedance to conventional current flow in the opposite direction. When conducting, the forward resistance of devices RE1 annd RE2 is very small and the voltage drop thereacross is also small. Voltage regulating gaseous discharge device 36 was, in the above noted constructed embodiment of the invention, a type 6074 tube adapted to maintain a voltage thereacross of 108 volts.

Tubes V5 and V6 are biased, in the light of the signal amplitudes, so that they are driven below grid cut off and to an effectively nonconductive state by the square-wave pulses applied to their control grids. As a result one of the two values which is assumed by each of the voltage pulse trains on conductors 34 and 38 is ground potential since the voltage drop across the cathode load resistors R19 and R20 is effectively zero during these periods. The other value preferably tends to be greater than the voltage drop across device 36, that is, in the above noted constructed arrangement, tends to be greater than 108 volts under the poorest expected conditions of plate voltage supply and tube characteristics. As a result, conductor 38 tends to rise above 108 volts during the positive peak of each square-wave pulse so that device RE1 becomes conductive and a measure of additional current flows through device 36 to hold conductor 38 at a maximum value of 108 volts positive relative to ground. Similarly, due to the action of device RE2 in conjunction with device 36, the voltage on conductor 34 cannot rise to a value more positive than approximately 108 volts relative to ground. Hence, both of the values between which each of the square-wave trains swings are fixed.

Since the pulse trains on conductors 34 and 38 are 180 degrees out of phase with one another, the voltage applied across rectifying device RE1 and device 36 via conductor 38 will be at a minimum in the period during which the voltage applied via conductor 34 across rectifying device RE2 and device 36 is at a maximum, and conversely. The provision of devices RE1 and RE2 prevents improper interaction between the two pulse trains.

By virtue of this arrangement, the current through device 36 remains substantially constant in that it is not subject to abrupt variations at the pulse-train frequency; instantaneously the voltage applied across device 36 from conductor 38 drops to a low value, the voltage applied thereacross from conductor 34 rises and vice versa. Consequently, device 36 is not subjected to abrupt severe voltage changes which produce transient disturbances of its regulating action.

It will be observed that by virtue of this arrangement, one of the two values of potential on each of the conductors 34 and 38 will always be ground potential, and the other one of the two values will be determined by the potential across device 36 even though that potential tends to change as a result in changes in the preceding electronic valve means including changes in the supply voltage appearing between conductor 14 and ground. The magnitude of the change of peak amplitude to which the voltages on conductors 34 or 38 would be subjected were it not for device 36 will not normally be great, in the illustrated circuit, due to the regulation of the supply voltage by devices 22 and 24 and due to the fact that the cathode followers V5 and V6 tend to be constant current devices and hence to have a regulating action in themselves. However, substantial changes in the line voltage 16 will be reflected in a change in the direct voltage between conductor 14 and ground due to the imperfect action of devices 22 and 24 (e.g., a 20 percent variation in line voltage may produce a 2 percent variation in the plate supply voltage) and the tube characteristics may change with age or temperature. It will also be observed that changes in the tube characteristics as between tubes V1 and V2, as between tubes V3 and V4, or as between tubes V5 and V6 may tend to produce an imbalance between the peak amplitudes of the voltages on the conductors 34 and 38 but that device 36 will again serve to maintain these peak values uniform. Such tube imbalance will not normally be sufficiently great to produce a sufficient change in the current through device 36 during any one pulse cycle to produce the above-noted transient disturbances, the current through device 36 remaining substantially constant.

The regulated signal on conductor 34 is applied through capacitor C12 and via conductor 40 to the junction of unidirectional current conducting devices or rectifiers RE3 and RE4 while the regulated signal on conductor 38 is applied through capacitor C13 and via conductor 42 to the junction of corresponding devices RE5 and RE6. These devices, preferably of the dry-disk or semi-conductor type, are again represented as having a low impedance to conventional current flow in the direction of the arrow and a high impedance to conventional current flow in the opposite direction. The other terminals of devices RE3 and RE5 are connected to ground and hence serve to by-pass to ground any voltage appearing on conductor 40 and 42, respectively, which tends to be negative with respect to ground, that is, the voltage on conductors 40 and 42 cannot become negative with respect to ground. The second terminals of devices RE4 and RE6 are connected to one another and to the wiper or movable element of potentiometer P1. One terminal of the resistive element of potentiometer P1 is connected to ground and the other is connected to the positive terminal of a galvanometer (such as a milliammeter) M1. The negative terminal of meter M1 is connected to ground through two parallel paths, one of which comprises resistor R21 and the other of which comprises variable resistor R22 serially connected with the resistive element of potentiometer P2. The wiper or movable element of potentiometer P2 is connected through resistor R23 to the anode of device 36.

The time constants are selected so that the circuit operates, in effect, to differentiate, rectify and integrate the signal. Thus, at the positive-going or leading edge of a positive square-wave voltage pulse at the cathode of tube V5 and on conductor 34, the current through capacitor C12 rises effectively instantaneously to a high value and then falls, exponentially, toward zero, reaching a low value prior to the termination of the input pulse. When the input pulse abruptly terminates (that is, at the trailing edge of the positive square-wave pulse), capacitor C12 discharges, the rate of current flow being initially high and reducing toward zero exponentially.

Rectifier RE4 presents a low impedance to the flow of charging current and a high impedance to the flow of discharging current, whereas rectifier RE3 presents a high impedance to the flow of charging current and a low impedance to the flow of discharging current. Consequently, the voltage across capacitor C12 does not become negative with respect to ground and tends to appear (as far as the action of capacitor C12 is concerned) as a series of positive-going spikes at the frequency of the input square-wave signal.

The circuit including capacitor C13 and rectifiers RE5 and RE6 acts similarly, producing a series of positive-going spikes at the frequency of the input square-wave signal. Both of these series of spikes are developed across the lower portion of the resistive element of potentiometer P1, and since the two square-wave pulse trains are 180 degrees out of phase, the total voltage signal across that portion of the resistive element of potentiometer P1 tends to appear as a series of positive-going spikes of a frequency twice that of either of the signals on conductors 34 and 38. These pulses are effectively integrated by meter M1 as a result of its electrical (inductive) and mechanical characteristics. The effective integration of these pulses over a time substantially greater than the period of the square-wave pulses causes the needle of meter M1 to assume a position determined by the average energy content of those pulses, and hence the position of the needle of meter M1 will vary in accordance with the frequency of the signal produced by source 10.

The network including resistor R23, resistor R21, variable resistor R22 and potentiometer P2 is provided to permit a direct voltage to be applied to the negative terminal of meter M1 so as to permit selection of the range of input signal frequencies which will produce deflection of that meter. While this meter biasing direct voltage could be obtained from a battery, from a separate power supply, or directly from the illustrated power supply, it is advantageous to derive it from the voltage across device 36 since that voltage is the most closely controlled voltage in the system, a result which accures from the relatively constant current through that device. The voltage across device 36 is developed across severally interconnected resistor R23 and that portion of the resistive element of potentiometer P2 appearing between the wiper thereof and ground, and the voltage across device 36 is also developed across the series circuit including resistor R23, the remaining portion of the resistive element of potentiometer P2, variable resistor R22 and resistor R21. The resultant potential between the junction of resistors R21 and R22 and ground is applied to the negative terminal meter M1. If desired, a unidirectional current conducting device RE7 can be conducted in shunt of meter M1 to prevent damage to the meter as a result of reverse current flow during those periods when the frequency of the signal from source 10 is lower than the selected zero value for meter M1.

It will be perceived that the system polarities can be reversed, if desired. It will further be perceived that tubes V5 and V6 could be connected as amplifiers rather than cathode followers, if desired, by, for example, connecting resistor R21 to a source of negative (rather than positive) potential, by interchanging the connections to the anodes and cathodes of tubes V5 and V6, and by reversing the polarity of devices RE1, RE2 and 36. It is also intended that the term "electronic valve means" be generic to transistor devices as, for example, to encompass the use of a grounded collector transistor circuits in lieu of the cathode followers which are disclosed.

In the aforesaid constructed embodiment of the invention, the current through device 36 was maintained at about 20 milliamperes, and the voltage across device 36 and the reading of meter M1 were found to vary less than ¼ of 1 percent with changes in the line voltage between 90 volts and 140 volts.

While it will be apparent that the embodiment of the invention herein disclosed is well calculated to fulfill the objects of the invention, it will be appreciated that the invention is susceptible to modification, variation and change without departing from the proper scope or fair meaning of the subjoined claims.

What is claimed is:

1. In a system for producing a direct voltage having a magnitude which varies in accordance with the frequency of a pulsating signal, the combination of means responsive to said signal for producing two out-of-phase trains of square-wave pulses each having a frequency controlled by the frequency of said signal and each having an amplitude that swings between a first relatively fixed value and a second value which tends to vary, means responsive to both of said trains for producing a direct voltage having a magnitude which varies in accordance with the frequency of said trains and which tends to vary with variations of said second values, and means for reducing variations of said second values comprising a voltage regulating gaseous discharge device and means for applying both of said trains to said device so that current flows in the same path through said device in response to both of said trains and remains substantially constant during any one period of said trains.

2. In a system for producing a direct voltage having a magnitude which varies in accordance with the frequency of a pulsating signal, the combination of means responsive to said signal for producing two out-of-phase trains of square-wave pulses each having a frequency controlled by the frequency of said signal and each having an amplitude that swings between a first relatively fixed value and a second value which tends to vary, means responsive to both of said trains for producing a direct voltage having a magnitude which varies in accordance with the frequency of said trains and which tends to vary with variations of said second values, and means for reducing variations of said second values, comprising a voltage regulating gaseous discharge device and means including a unidirectional current conducting element individual to each of said trains for applying both of said trains to said device so that current flows in the same path through said device in response to both of said trains and remains substantially constant during any one period of said trains.

3. In a system for producing a direct voltage having a magnitude which varies in accordance with the frequency of a pulsating signal, the combination of means responsive to said signal for producing two out-of-phase trains of square-wave voltage pulses each having a frequency controlled by the frequency of said signal and each having an amplitude that swings between a first relatively fixed value and a second value which tends to vary, means responsive to both of said trains for producing a direct voltage having a magnitude which varies in accordance with the frequency of said trains and which tends to vary with variations of said second values, and means for reducing variations of said second values comprising a voltage regulating gaseous discharge device and means comprising a unidirectional current conducting element individual to each of said trains for applying both of said voltage trains across said device.

4. In a system for producing a direct voltage having a magnitude which varies in accordance with the frequency of a pulsating signal, the combination of means responsive to said signal for producing two out-of-phase trains of square-wave voltage pulses each having a frequency controlled by the frequency of said signal and each having an amplitude that swings between a first relatively fixed value and a second value which tends to vary, means responsive to both of said trains for producing a direct voltage having a magnitude which varies in accordance with the frequency of said trains and which tends to vary with variations of said second values, and means for reducing variations of said second values comprising a voltage regulating gaseous discharge device and means comprising a unidirectional current conducting element individual to each of said trains for applying both of said voltage trains across said device, said device serving to maintain across itself a voltage having a magnitude which is less than the minimum value to which said second value would tend to vary.

5. In a system for producing a direct voltage having a magnitude which varies in accordance with the frequency of a pulsating signal, the combination of means responsive to said signal for producing two out-of-phase trains of square-wave pulses each having a frequency controlled by the frequency of said signal and each having an amplitude that swings between ground and a value which tends to vary, means responsive to both of said trains for producing a direct voltage having a magnitude which varies in accordance with the frequency of said trains and which tends to vary with variations of said values, and means for reducing variations of said values comprising a voltage regulating gaseous discharge device and means for applying both of said trains to said device so that current flows in the same path through said device in response to both of said trains and remains substantially constant during any one period of said trains.

6. In a system for producing a direct voltage having a magnitude which varies in accordance with the frequency of a pulsating signal, the combination of means responsive to said signal for producing two out-of-phase trains of square-wave voltage pulses each having a frequency controlled by the frequency of said signal and each having an amplitude that swings between a first relatively fixed value and a second value which tends to vary, means including differentiating and rectifying means responsive to both of said trains for producing a direct voltage having a magnitude which varies in accordance with the frequency of said trains and which tends to vary with variations of said second values, and means for reducing variations of said second values comprising a voltage regulating gaseous discharge device and means comprising a unidirectional current conducting element individual to each of said trains for applying both of said voltage trains across said device.

7. In a system for producing a direct voltage having a magnitude which varies in accordance with the frequency of a pulsating signal, the combination of means responsive to said signal for producing two out-of-phase trains of square-wave voltage pulses each having a frequency controlled by the frequency of said signal and each having an amplitude that swings between a first relatively fixed value and a second value which tends to vary, means including differentiating and full-wave rectifying means responsive to both of said trains for producing a direct voltage having a magnitude which varies in accordance with the frequency of said trains and which tends to vary with variations of said second values, and means for reducing variations of said second values comprising a voltage regulating gaseous discharge device and means comprising a unidirectional current conducting element individual to each of said trains for applying both of said voltage trains across said device.

8. In a system for producing a direct voltage having a magnitude which varies in accordance with the frequency of a pulsating signal, the combination of means including two electronic valve means responsive to said signal for producing two out-of-phase trains of square-wave pulses each having a frequency controlled by the frequency of said signal and each having an amplitude that swings between a first relatively fixed value and a second value which tends to vary with changes in the valve means, said valve means being individual to said trains, means responsive to both of said trains for producing a direct voltage having a magnitude which varies in accordance with the frequency of said trains and which tends to vary with variations of said second values, and means for reducing variations of said second values comprising a voltage regulating gaseous discharge device and means including a unidirectional current conducting element individual to each of said trains and individual and coupled to each of said valve means for applying both of said trains to said device so that current flows in the same path through said device in response to both of said trains and remains substantially constant during any one period of said trains.

9. In a system for producing a direct voltage having a magnitude which varies in accordance with the frequency of a pulsating signal, the combination of means responsive to said signal and including a flip-flop circuit and two cathode followers each having a cathode resistor for producing two out-of-phase trains of square-wave voltage pulses each having a frequency controlled by the frequency of said signal and each having an amplitude that swings between a first relatively fixed value and a second value which tends to vary, each of said voltage trains being developed across an individual one of said cathode resistors, means responsive to both of said trains for producing a direct voltage having a magnitude which varies in accordance with the frequency of said trains and which tends to vary with variations of said second values, and means for reducing variations of said second values comprising a voltage regulating gaseous discharge device, two unidirectional current conducting elements, means for connecting one of said elements in series with said device across one of said cathode resistors, and means for connecting the other one of said elements in series with said device across the other one of said cathode resistors so that the amplitude of the voltage applied across said device remains substantially constant during any one period of said trains.

References Cited in the file of this patent

UNITED STATES PATENTS 2,530,081   Ross _____ Nov. 14, 1950